(12) United States Patent
Le et al.

(10) Patent No.: US 9,836,081 B2
(45) Date of Patent: Dec. 5, 2017

(54) DISPLAY DEVICE HOUSING AND FORM-FITTED CONFIGURATION

(71) Applicant: AMX LLC, Richardson, TX (US)

(72) Inventors: Phong Viet-Thanh Le, Lewisville, TX (US); Douglas N. Laube, Farmersville, TX (US)

(73) Assignee: AMX LLC, Richardson, TX (US)

( * ) Notice: Subject to any disclaimer, the term of this patent is extended or adjusted under 35 U.S.C. 154(b) by 0 days.

(21) Appl. No.: 15/354,545

(22) Filed: Nov. 17, 2016

(65) Prior Publication Data

US 2017/0068269 A1 Mar. 9, 2017

Related U.S. Application Data

(63) Continuation of application No. 15/061,697, filed on Mar. 4, 2016, now Pat. No. 9,529,382, which is a continuation of application No. 14/156,600, filed on Jan. 16, 2014, now Pat. No. 9,310,833.

(51) Int. Cl.
*F16M 13/00* (2006.01)
*G06F 1/16* (2006.01)

(52) U.S. Cl.
CPC .................................. *G06F 1/1601* (2013.01)

(58) Field of Classification Search
CPC ......... B60R 11/0241; B60R 2011/0071; B60R 2011/0075; B60R 2011/0078; B60R 11/02; B60R 2011/0059; B60R 11/0247; B60R 2011/0005; B60R 2011/0082; B60R 11/0252; B60R 2011/0085; B60R 2011/0089; H04M 1/04; H04M 1/6075; H04M 1/6041; H04M 1/05; H04M 1/06; H04M 1/0214; H04M 1/11; H04M 1/725; H04M 1/15; H04M 1/72519; H04M 1/72527; H04M 1/0262; H04M 1/02; H04M 1/0283; H04M 1/0202; A45F 2200/0516; A45F 5/02; A45F 5/021; A45F 5/00; A45F 2005/026; A45F 2200/0508; A45F 5/004; A45F 2005/008; A45F 2005/025; A45F 2003/006; A45F 2200/0525; A45F 2003/002; A45F 2200/0533
USPC ....... 248/917, 919, 921, 922, 923, 121, 127, 248/371, 398; 361/679.56, 679.21
See application file for complete search history.

(56) References Cited

U.S. PATENT DOCUMENTS

| | | | | |
|---|---|---|---|---|
| 5,100,098 A * | 3/1992 | Hawkins | ............... | F16M 11/041 16/339 |
| 8,056,877 B2 * | 11/2011 | Wang | ..................... | F16M 11/10 248/157 |
| 8,256,734 B1 * | 9/2012 | Chen | ..................... | F16M 11/041 248/309.1 |
| 9,066,442 B2 * | 6/2015 | Huebner | ................ | F16M 11/10 |

(Continued)

*Primary Examiner* — Steven Marsh (57) ABSTRACT

A display device may be mounted at a predetermined angle via a free-standing display housing. In one example, the display device bracket may include at least two spring loaded tabs and a display monitor affixed to the display device bracket. A base mount may be on a resting surface with at least one side that is configured to make contact with the display device. A rear housing cover may also be included with at least two receiving tabs form-fitted to receive the spring loaded tabs and provide a secure spring-loaded locking position that maintains the display device bracket in a locked position and in an upright predefined angled viewing position.

19 Claims, 7 Drawing Sheets

400

(56) References Cited

U.S. PATENT DOCUMENTS

| | | | |
|---|---|---|---|
| 2003/0121124 A1* | 7/2003 | Chen | E05D 11/087 16/339 |
| 2003/0174259 A1* | 9/2003 | Yang | F16M 11/041 349/58 |
| 2004/0113031 A1* | 6/2004 | Sung | F16M 11/105 248/146 |
| 2004/0155166 A1* | 8/2004 | Kim | F16M 11/10 248/291.1 |
| 2005/0023418 A1* | 2/2005 | Kim | G06F 1/1601 248/121 |

* cited by examiner

DISPLAY DEVICE HOUSING AND FORM-FITTED CONFIGURATION

CROSS-REFERENCE TO RELATED APPLICATIONS

The present patent application is a continuation of U.S. patent application Ser. No. 15/061,697, filed Mar. 3, 2016, titled "DISPLAY DEVICE HOUSING AND FORM-FITTED CONFIGURATION", which is a continuation of U.S. patent application Ser. No. 14/156,600 entitled "DISPLAY DEVICE HOUSING AND FORM-FITTED CONFIGURATION", filed Jan. 16, 2014, now issued as U.S. Pat. No. 9,310,833 on Apr. 12, 2016, the entire contents of which are herein incorporated by reference.

TECHNICAL FIELD OF THE APPLICATION

This application relates to an apparatus that provides a housing for a product insert, and more specifically to a housing that has a form-fitted enclosure that may be easily setup and maintained without the need for screws or other similar fastening mechanisms.

BACKGROUND OF THE APPLICATION

Conventionally, the design of a device (i.e., monitor) housing is generally a rectangular box with various hardware components mounted inside the box which are otherwise hidden from an outside view perspective. A bezel frame may be referred to as the outside frame around a computer or monitor device. The bezel frame or housing is affixed together as two or more parts, such as a front portion and a back portion which together form the housing. The housing is generally kept together by numerous screws which take time to put together and which can also be easily lost if the screws are separated from the housing portions. However, none of the previous device housings have been constructed to provide a hardware configuration of the present application.

SUMMARY OF THE APPLICATION

An example embodiment may include a display device bracket with at least two spring loaded tabs and a display monitor affixed to the display device bracket, a base mount with at least one side that is configured to make contact with the display device, and a rear housing cover with at least two receiving tabs form-fitted to receive the spring loaded tabs and provide a secure spring-loaded locking position that maintains the display device bracket in a locked position and in an upright predefined angled viewing position.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of an apparatus, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
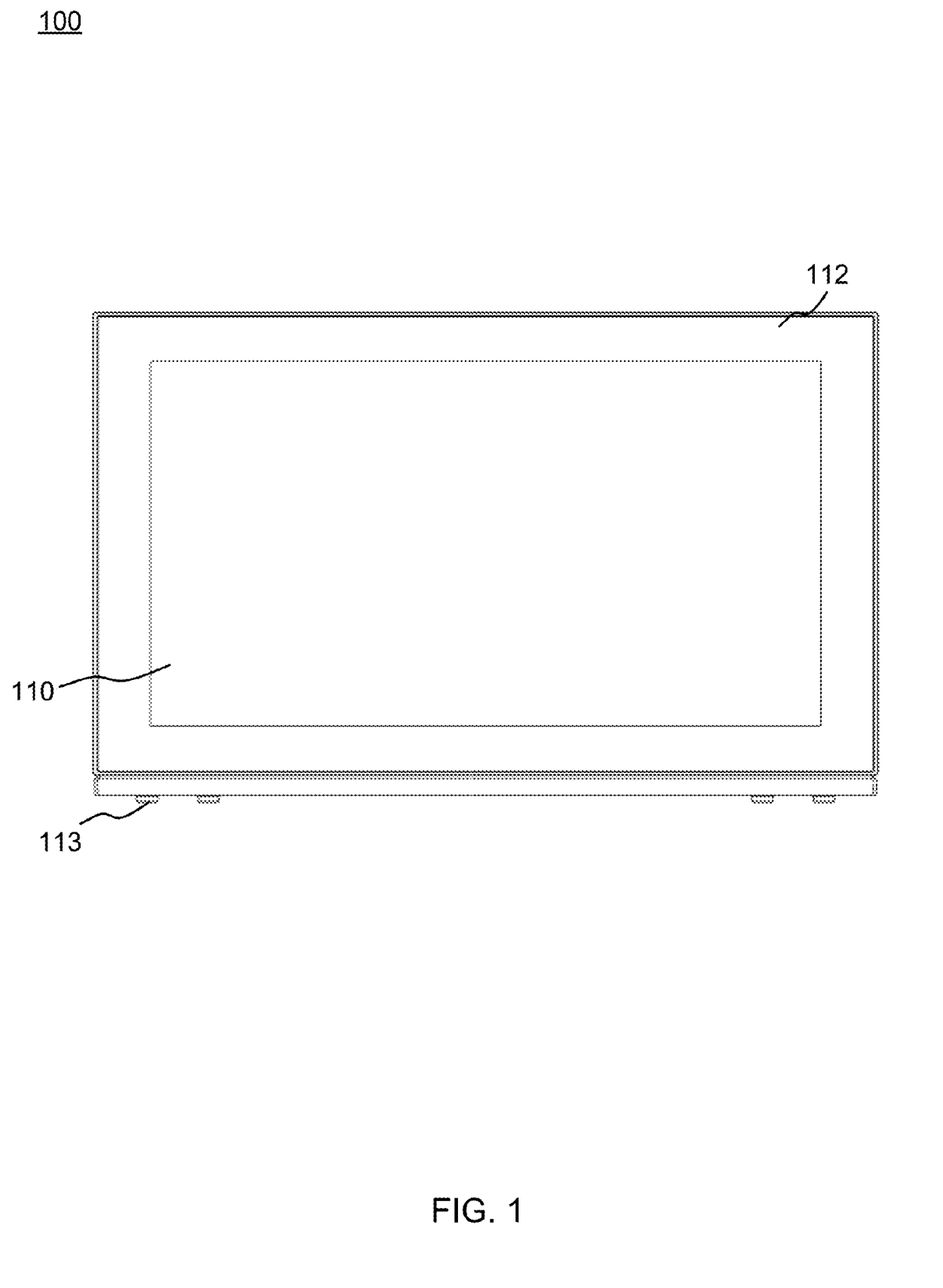
FIG. 1 is a front view of a display device.

FIG. 1 is a front view of a display device. Referring to FIG. 1, the display device 100 includes a main display area 110, such as a liquid crystal display (LCD), light-emitting diode (LED), and/or cathode ray tube (CRT) type of display device. The display front may also include a border, frame or surrounding support structure 112. The bottom of the display frame include support legs 113 in any number to provide a support that keeps the monitor elevated off the table in case of moisture or related hazards.

Figure 2:
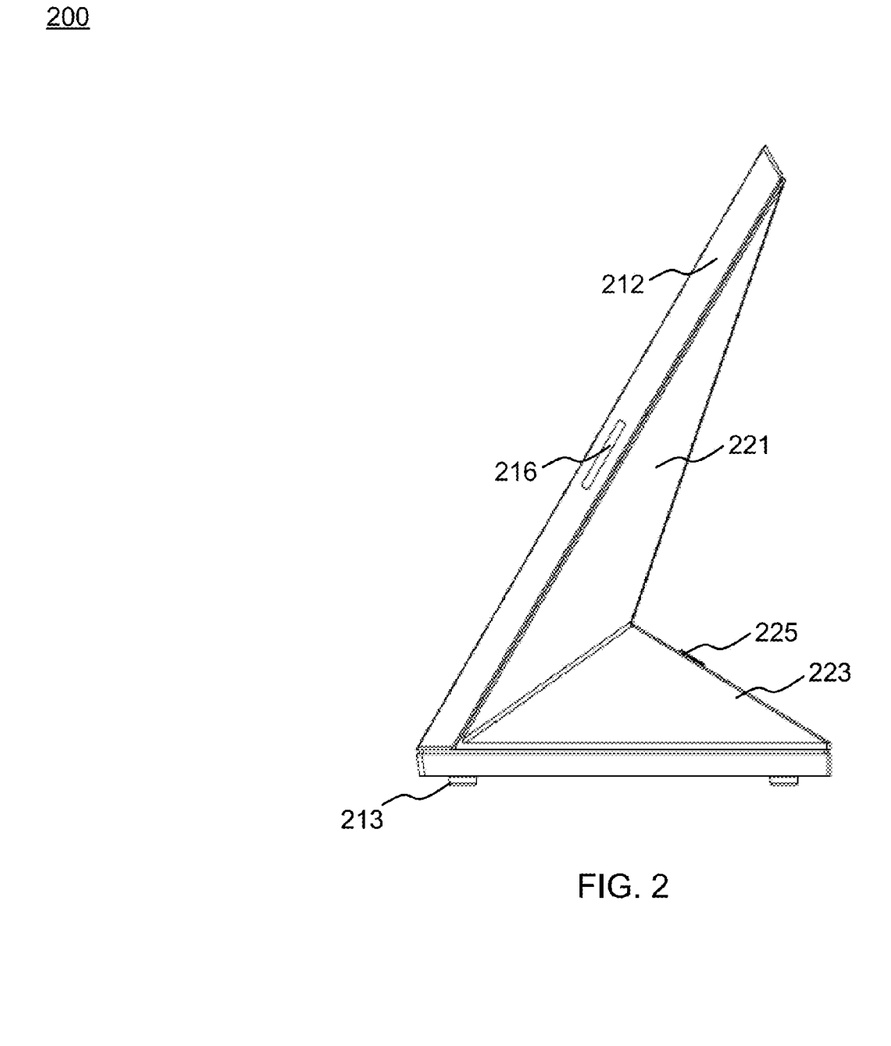
FIG. 2 is a right side profile view of the display device.

FIG. 2 is a side view of the display device 200. Referring to FIG. 2, the display frame 212 illustrates the border of the display and the rear display housing is formed of one or two parts 221 and 223 which support the rear display hardware and controls, including one or more of an A/C adapter, a graphics display card, memory, power supply, control buttons, etc. The legs 213 support the frame off the resting surface to avoid contact with moisture (e.g., spilled beverages, etc.), and the light emitting diode (LED) 216 provides an indicator to persons seeking access to the display. For example, the LED 216 may provide a first color red when a scheduled meeting is in session, or a second color yellow when the meeting is near its end or the scheduled time frame is over. The color green may indicate that the monitor is free to use in a conference room type of setting so the persons approaching the monitor may view the current status of the monitor. A scheduling program or application may integrate with the monitor's controls to change the LED 216 when the time frame is over or is about to end or other indicator, etc. The button 225 provides access to a control function such as power or other controlling feature. Both the upper cover 221 and the bottom cover 223 may be part of the same rear housing cover that is form-fitted onto the front display housing by a spring loaded series of tabs and corresponding slots.

Figure 3:
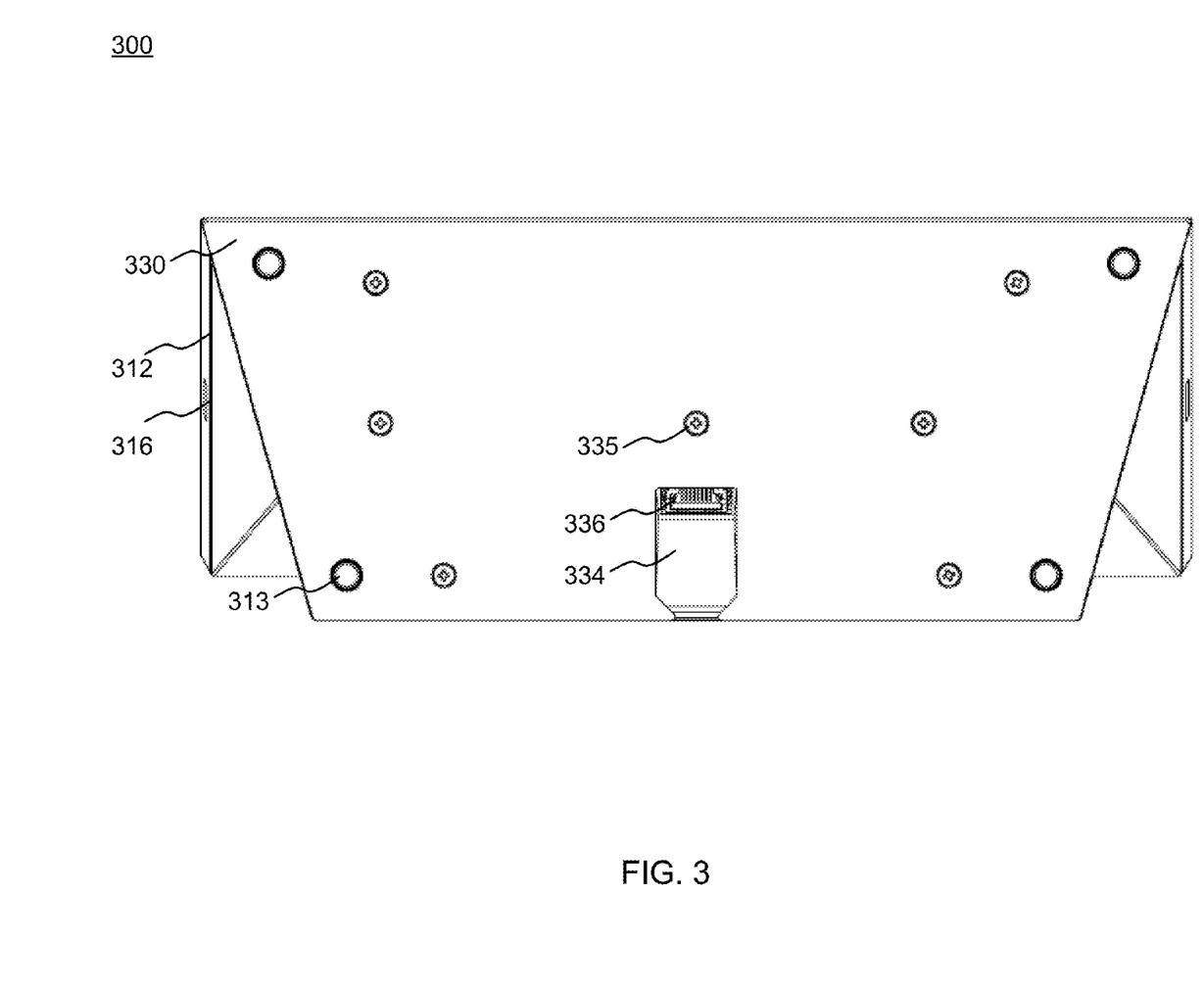
FIG. 3 is a bottom view of the display device housing.

FIG. 3 is a bottom view perspective of the free-standing display frame 300. The resting surface of the display may be parallel with the resting surface of the frame 330. The legs 313 may provide a gap between the frame 330 and the resting surface. The display frame 312 is illustrated as being angled upward from the bottom of the display frame 312. The LED 316 is also shown as being part of the display frame 312. The receiving slot 334 provides access to a digital input interface 336 and/or power interface and/or Ethernet interface. The screws 335 may be part of the original frame configuration but may not be required to mount the frame to the display device.

Figure 4:
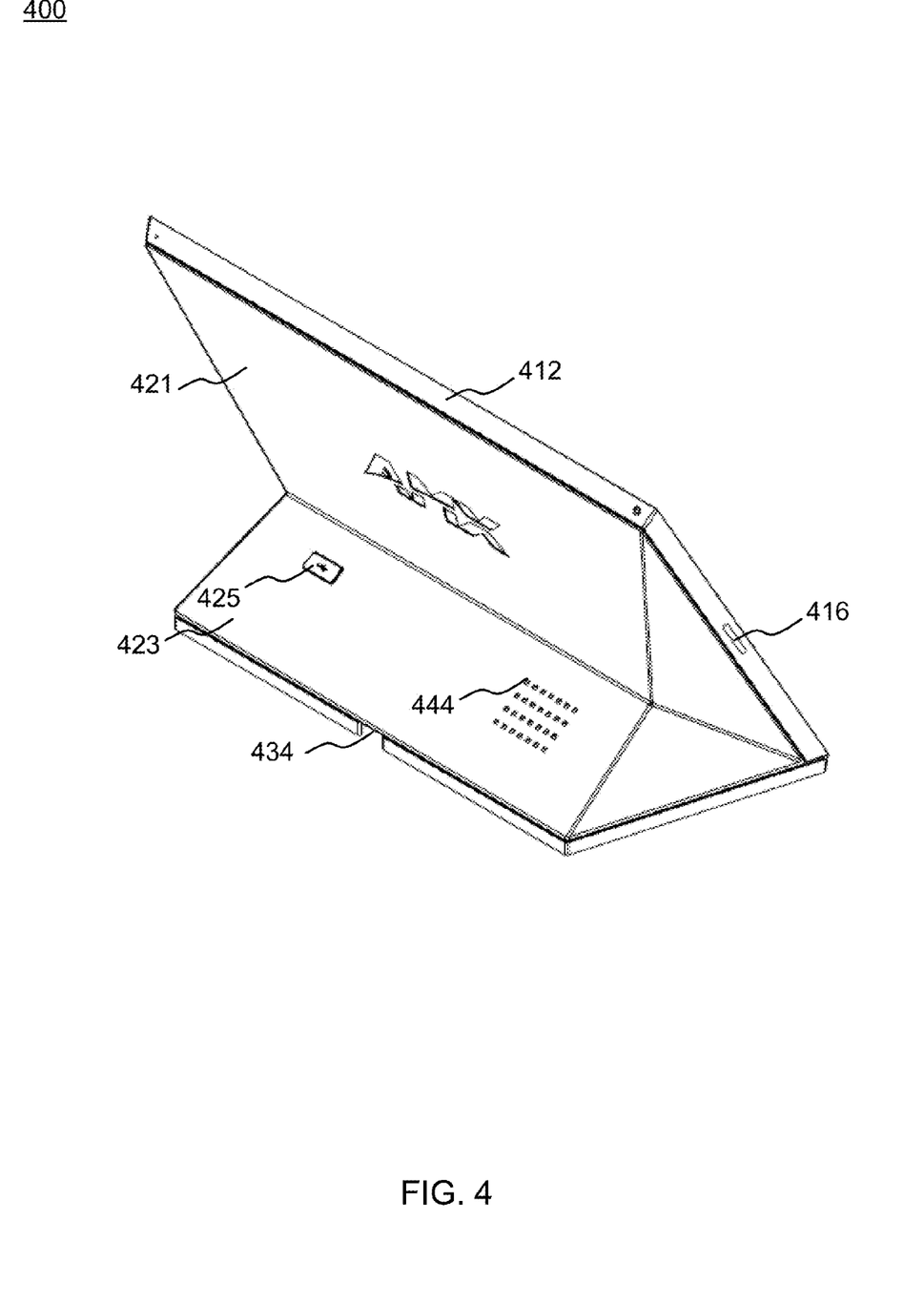
FIG. 4 is a rear-side perspective of the display device and its corresponding housing.

FIG. 4 illustrates a rear view perspective 400 of the display device. The back cover includes an upper portion 421 and a lower portion 423 which may be bound together or may be separate covers each of which may be snapped into position via a form-fitted slot configuration on the display frame 412. The LED 416 provides an indicator to persons seeking access to the display and the vent holes 444 provide a ventilation for heat dissipation. The button 425 provides a way to remove the cover or access a power button on the display. The receiving slot 434 is where the data cable from the CPU device may be inserted to provide digital information to the display.

Figure 5:
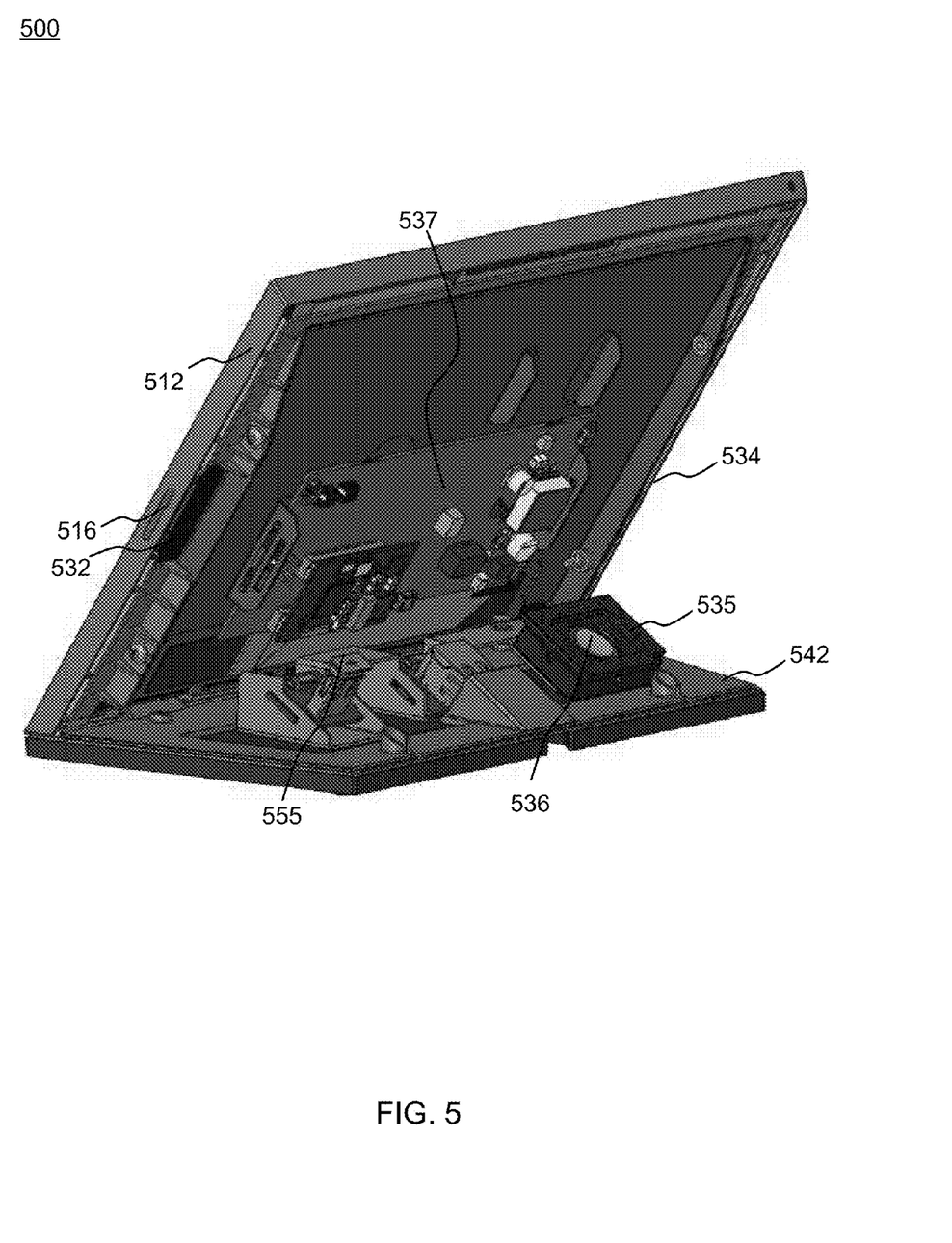
FIG. 5 is an internal view of the backside of the display device.

FIG. 5 is an internal view of the backside of the main/front display device portion. Referring to FIG. 5, the internal view 500 provides a view of the internal display components, such as but not limited to the LED 516, the securing tabs 532 and 534, a camera assembly 535 and corresponding camera lens 536, integrated circuit (IC) hardware and related controls 537 and a data bus and/or power supply portion. Also, the button 555 used to access the cover or control power to the display is shown and a bottom surface 542. When placing the main/front display device portion into the rear device housing, the tabs 532 and 534 may be met with affixing slots or receiving tabs on the rear device cover portion. The slots and tabs provide an easy form-fitted configuration to securely combine the front and rear portions of the display housing. The tabs 532 and 534 may slide through the receiving slots on the rear cover and into form-fitted slots which keep the tabs in place from a certain degree of tension provided by a spring or torsion force of the tabs position in the corresponding slots. The examples illustrated in FIGS. 1-5 relate to a free-standing display and device housing. Each of the examples may also provide a common frame bezel for all mounting needs whether the sizes are 4.3 inches, 7 inches, 10 inches, etc. The ultra-thin slim design may be for 1 inch or less in thickness. The frame may also provide a grounding path for the electronics without any additional wiring.

The display frame is attached to a rear housing portion which includes tabs in either both the left and right sides of the top portion and/or or two locations on the bottom portion providing 2, 4 or more tabs to assist with form-fitted snapping into place when mounting the display onto the free-standing bracket or other mounting bracket. The tabs are spring loaded and provide resistance when pressed downward into the direction of the device housing. The table top base may be a PCB snap-in configuration. The configuration permits the independent positioning of the circuit board in the housing, the speaker box and USB connector may be positioned across the rear cover by the bracket, the Ethernet port is positioned at the bottom of the unit so up to a Category-6 (CAT-6) cable may be introduced or other cable type. Also, no screws are needed to close the housing and the grounding path is established without additional wiring.

Figure 6:
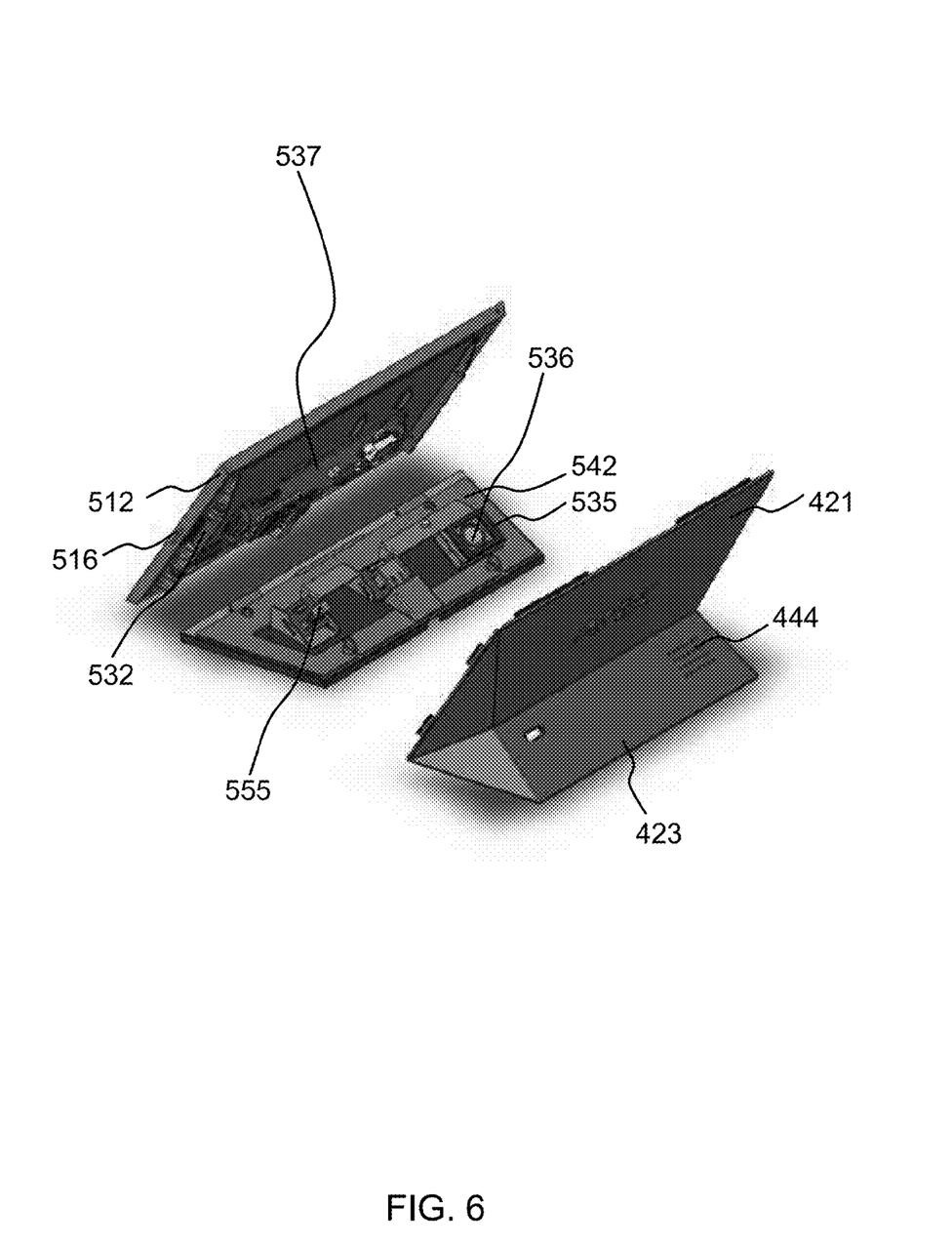
FIG. 6 is an exploded rear view of the display and rear cover according to example embodiments.

FIG. 6 is an exploded rear view of the display, mounting surface and rear cover according to example embodiments. Referring to FIG. 6, in the exploded view of the display device 600, like reference numerals refer to like elements in other illustrations. The main three components are the display device and its surface mounting platform and the rear cover all of which may snap, screw or adjustably fit one another to form a free standing display stand.

Figure 7:
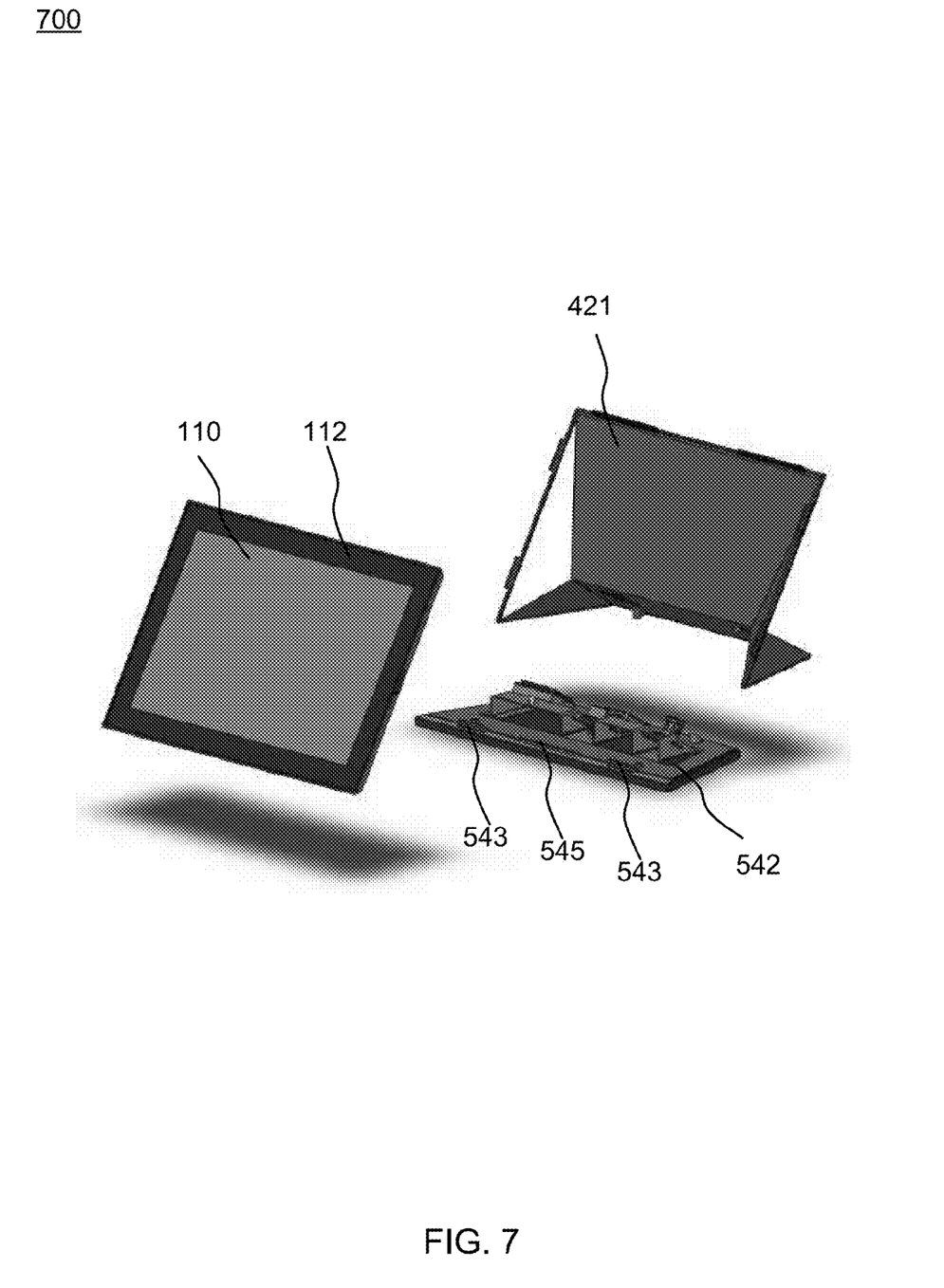
FIG. 7 is an exploded front view of a display and rear cover according to example embodiments.

FIG. 7 is an exploded front view of a display, mounting, and rear cover according to example embodiments. In FIG. 7, the front view 700 includes the same main three components which include the display device, its corresponding surface mounting platform and the rear cover all of which may snap, screw or adjustably fit one another to form a free standing display stand. The securing lips may be one, two or more and in this example of FIG. 7, the securing lip may provide a resting surface for a resting tab inside the display bracket. The securing lips 543 may be on far ends of the base plate and a longer securing lip 545 may be in the middle between the two shorter securing lips 543.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the invention.

One having ordinary skill in the art will readily understand that the application as discussed above may include hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus, comprising:
a display device bracket comprising at least two spring loaded tabs;
a mount with at least one side that is configured to make contact with the display device bracket; and
a rear housing cover with at least two receiving tabs configured to receive the spring loaded tabs and maintain the display device bracket in a locked position;
wherein the mount includes three securing lips that maintain the display device bracket;
wherein the rear housing cover covers the mount portion on three sides that are not occupied by the display device bracket.

2. The apparatus of claim 1, wherein a secure spring-loaded locking position maintains the display device bracket in an upright predefined angled viewing position.

3. The apparatus of claim 2, wherein the predefined angled viewing position is between 30 and 90 degrees.

4. The apparatus of claim 1, wherein the rear housing cover has six facets.

5. The apparatus of claim 1, wherein the at least two receiving tabs comprise four receiving tabs with two receiving tabs on one side of the rear cover and two receiving tabs on an opposite side to the one side of the rear cover.

6. The apparatus of claim 1, wherein the at least two receiving tabs comprise six receiving tabs, and wherein at least two of the receiving tabs are longer than the other remaining receiving tabs.

7. The apparatus of claim 1, wherein the mount comprises at least one resting tab that provides at least one securing lip to maintain the display bracket in a fixed angled position.

8. The apparatus of claim 7, wherein the at least one securing lip comprises two securing lips.

9. The apparatus of claim 1, comprising a display monitor affixed to the display device bracket.

10. An apparatus, comprising:
- a display device bracket comprising at least two spring loaded tabs;
- a mount with at least one side that is configured to make contact with the display device bracket; and
- a rear housing cover with at least two receiving tabs configured to receive the spring loaded tabs and provide the display device bracket in a locked position;
- wherein the base mount includes three securing lips that maintain the display device bracket;
- wherein the rear housing cover covers the mount portion on three sides that are not occupied by the display device bracket.

11. The apparatus of claim 1, wherein a secure spring-loaded locking position maintains the display device bracket in an upright predefined angled viewing position.

12. The apparatus of claim 11, wherein the predefined angled viewing position is between 30 and 90 degrees.

13. The apparatus of claim 1, wherein one of the three securing lips is longer than another two of the three securing lips.

14. The apparatus of claim 1, wherein the rear housing cover has six facets.

15. The apparatus of claim 1, wherein the at least two receiving tabs comprise four receiving tabs with two receiving tabs on one side of the rear cover and two receiving tabs on an opposite side to the one side of the rear cover.

16. The apparatus of claim 1, wherein the at least two receiving tabs comprise six receiving tabs, and wherein at least two of the receiving tabs are longer than the other remaining receiving tabs.

17. The apparatus of claim 1, wherein the mount comprises at least one resting tab that provides at least one securing lip to maintain the display bracket in a fixed angled position.

18. The apparatus of claim 17, wherein the at least one securing lip comprises two securing lips.

19. The apparatus of claim 1, comprising a display monitor affixed to the display device bracket.

* * * * *